(12) United States Patent
Wada (10) Patent No.: US 7,840,666 B2
(45) Date of Patent: Nov. 23, 2010

(54) DEVICE, CONTROL METHOD OF THE DEVICE, AND PROGRAM FOR CAUSING COMPUTER TO EXECUTE THE CONTROL METHOD

(75) Inventor: Katsuhiro Wada, Kawasaki (JP)

(73) Assignee: Canon Kabushiki Kaisha (JP)

( * ) Notice: Subject to any disclaimer, the term of this patent is extended or adjusted under 35 U.S.C. 154(b) by 846 days.

(21) Appl. No.: 11/738,983

(22) Filed: Apr. 23, 2007

(65) Prior Publication Data

US 2007/0249345 A1 Oct. 25, 2007

(30) Foreign Application Priority Data

Apr. 24, 2006 (JP) .............................. 2006-119257

(51) Int. Cl.
*G06F 15/16* (2006.01)
(52) U.S. Cl. ..................................... 709/224; 709/232
(58) Field of Classification Search ................. 709/223, 709/224, 230, 232
See application file for complete search history.

(56) References Cited

U.S. PATENT DOCUMENTS

2004/0181588 A1 * 9/2004 Wang et al. ................. 709/207

FOREIGN PATENT DOCUMENTS

JP 11-224226 A 8/1999

* cited by examiner

*Primary Examiner*—David Lazaro
(74) *Attorney, Agent, or Firm*—Rossi, Kimms & McDowell LLP

(57) ABSTRACT

A device capable of flexibly changing a protocol for use for event communication in consideration of communication load applied to an event providing apparatus. The device receives an event registration request transmitted from a client apparatus, and based on the received event registration request, notifies a generated event to the client apparatus. When receiving an event registration request, the device determines whether or not communication load caused by event notification exceeds a threshold value, and based on the result of determination, decides a protocol for use for the event notification to the event registration request.

9 Claims, 9 Drawing Sheets

```
<s:Envelope...>
  <s:Header...>
    <wsa:Action>
      http://xmlsoap.org/ws/2004/05/eventing/subscribe
    </wsa:Action>
    ...
  </s:Header>
  <s:Body...>
    <wse:Subscribe...>
      <wse:EndTo>endpoint-reference</wse:EndTo>?
      <wse:Delivery Mode="xs:anyURI"?>xs:any</wse:Delivery>
      <wse:Expires>[xs:dateTime | xs:duration]</wse:Expires>?
    </wse:Subscribe>
  </s:Body>
</s:Envelope>
```

DEVICE, CONTROL METHOD OF THE DEVICE, AND PROGRAM FOR CAUSING COMPUTER TO EXECUTE THE CONTROL METHOD

BACKGROUND OF THE INVENTION

1. Field of the Invention

The present invention relates to a device for providing an event via a communication medium in accordance with a request from a client apparatus, a control method of the device, and a program for causing a computer to execute the control method.

2. Description of the Related Art

An event providing system has conventionally been known, which includes an event providing apparatus for transmitting an event to a client apparatus on a network based on an event registration request from the client apparatus (see, Japanese Laid-open Patent Publication No. H11-224226, for example).

There have also been proposed various protocols and architectures for providing application software, utility software, operating systems, etc. for use by an event providing apparatus to execute event registration, deletion of registered events, control/display of events, and so forth.

Furthermore, in order to meet an expansion of the standard method for event registration, event transmission, deletion of registered events, etc., many companies and standard-setting organizations promote the designing of protocol specifications and architecture specifications.

By providing events using the aforesaid prior art, it is possible to immediately renew information to thereby improve convenience of users. However, event registration requests when made by a large number of client apparatuses can cause a problem of a large communication load being applied to a communication unit of an event providing apparatus (device).

In general, the TCP protocol applies a larger communication load to the communication unit than that applied by the UDP protocol. Furthermore, the IPSec protocol and the SSL protocol apply a still larger communication load to the communication unit than that applied by the TCP protocol.

Protocols each requiring higher load are occasionally used by many of applications, which are used by general users. In this case, usage of a network equipment management application by a manager can sometimes be hindered.

Furthermore, there is a limit in the number of event destinations (the number of endpoints) that can be registered for each protocol in an event providing apparatus (device). The registerable number of event destinations for the entire protocols is also limited. Therefore, once event registrations up to the maximum possible number of endpoints have been made by general users' communication equipment monitoring applications, any further event registration even by a network equipment management application for use by a manager is no longer possible.

SUMMARY OF THE INVENTION

The present invention provides a device, a control method of the device, and a program for causing a computer to execute the control method that are capable of flexibly changing a protocol for use for event communication in consideration of communication load.

According to a first aspect of the present invention, there is provided a device comprising a receiver device adapted to receive an event registration request transmitted from each of at least one information processing apparatus on a network, a notification device adapted to notify a generated event to a corresponding one of the at least one information processing apparatus based on the event registration request received by the receiver device, a storage device adapted to store at least one threshold value relating to communication load caused by event notification, a determination device adapted to determine whether or not the communication load caused by event notification exceeds the threshold value in a case where the receiver device receives the event registration request, and a decision device adapted to decide, based on a result of determination by the determination device, a protocol for use for the event notification to the event registration request.

According to a second aspect of the present invention, there is provided a control method of a device comprising a receiver step of receiving an event registration request transmitted from each of at least one information processing apparatus on a network, a notification step of notifying a generated event to a corresponding one of the at least one information processing apparatus based on the event registration request received in the receive step, a storage step of storing at least one threshold value relating to communication load caused by event notification, a determination step of determining whether or not the communication load caused by event notification exceeds the threshold value in a case where the receiver step receives the event registration request, and a decision step of deciding, based on a result of determination by the determination step, a protocol for use for the event notification to the event registration request.

According to a third aspect of the present invention, there is provided a program for causing a computer to execute the control method according to the second aspect of the present invention.

According to the present invention, it is possible to flexibly change a protocol for use for event communication in consideration of communication load applied to a device.

Further features of the present invention will become apparent from the following description of exemplary embodiments with reference to the attached drawings.

DETAILED DESCRIPTION OF THE PREFERRED EMBODIMENTS

The present invention will now be described in detail below with reference to the drawings showing preferred embodiments thereof.

First Embodiment

Figure 1:
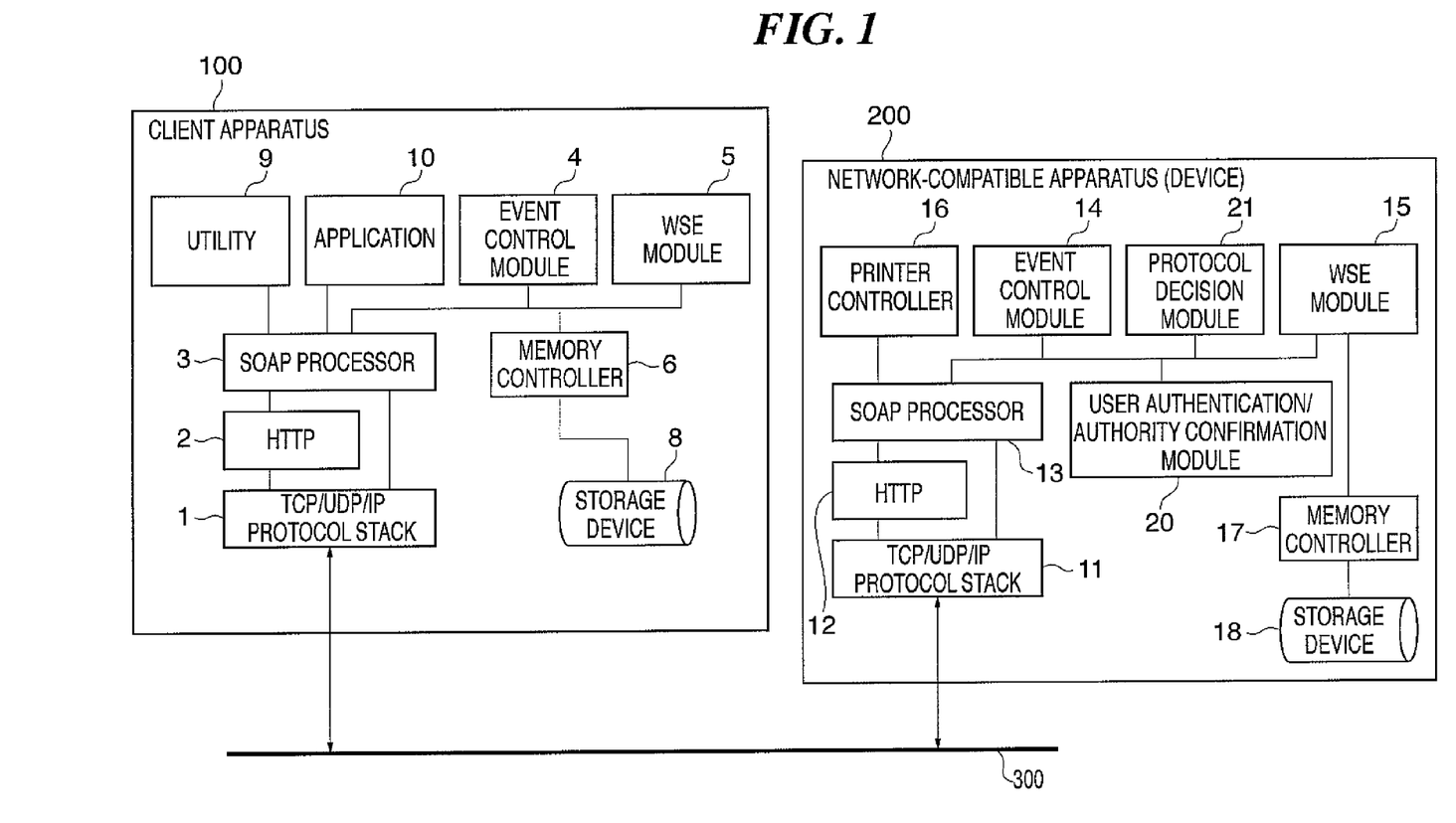
FIG. 1 is a view showing the construction of a communication system including an event providing device according to any of first, second, and third embodiments of the present invention.

FIG. 1 is a view showing the construction of a communication system including an event providing device according to any of first, second, and third embodiments of the present invention. In FIG. 1, the construction of utility software for event registration is mainly shown.

As shown in FIG. 1, this communication system includes a client apparatus 100 and a network-compatible apparatus (device) 200 that are connected to each other via a network 300 such as Ethernet®. In this embodiment, it is assumed that the client apparatus 100 is comprised of an information processing apparatus such as a personal computer, and the network-compatible apparatus is comprised of a printer. However, the network-compatible apparatus may be comprised of any other device such as a scanner, a copying machine, a facsimile, or a multifunction peripheral, each of which can be connected to a network. The printer as the network-compatible apparatus 200 also functions as the event providing apparatus. Although a plurality of client apparatuses 100 are connected via the network to the network-compatible apparatus 200 in actual, only one of the client apparatuses 100 is illustrated in FIG. 1.

In FIG. 1, the client apparatus 100 has an Ethernet®-compatible communication function. More specifically, the client apparatus 100 comprises a TCP/UDP/IP protocol stack 1 and an HTTP 2, and is adapted to analyze an HTTP request and carry out response processing and so forth.

A SOAP (simple object access protocol) processor 3 is provided, which is higher in layer than the TCP/UDP/IP protocol stack 1 and the HTTP 2. Under the control of the SOAP processor 3, a utility 9 and the WSE module 5 carry out bi-directional communication of XML (extensible markup language) data.

The event control module 4 controls an event, and performs writing, reading, and erasing of information required for event registration, event reception, or the like into and from a storage device 8 via a memory controller 6.

The event control module 4 requests the WSE module 5 to carry out processing of transmission of a subscribe message or the like.

Under the control of the SOAP processor 3, the WSE module 5 performs issue processing of issuing a subscribe message for event registration, an unsubscribe message for erasing a registered event, or the like to the network-compatible apparatus 200. The subscribe message is a request for registering contents of an event to be notified to the client apparatus among events generated in the device, whereas the unsubscribe message is a request for erasing an event registered in the device. The WSE module 5 processes a notification message notified from the network-compatible apparatus 200 in accordance with an issue message. In this connection, the network-compatible apparatus 200 transmits the notification message to the client apparatus 100 when there occurs a state transition of a registered event.

When receiving such a notification message, the event control module 4 transmits the notification message to software such as the utility 9, the application 10 or the like that has issued an event request to the event control module 4. An event, a message, or the like associated with the received notification message is stored in the storage device 8 by means of the memory controller 6.

As in the client apparatus 100, the network-compatible apparatus 200 has an Ethernet®-compatible communication function. More specifically, the network-compatible apparatus 200 comprises a TCP/UDP/IP protocol stack 11 and an HTTP 12, and is adapted to analyze an HTTP request and carry out response processing, etc.

A SOAP processor 13 is provided, which is higher in layer than the TCP/UDP/IP protocol stack 11 and the HTTP 12. Under the control of the SOAP processor 13, a WSE module 15 and a printer controller 16 carry out bi-directional communication of XML data.

Under the control of the SOAP processor 13, the WSE module 15 performs response processing in response to a subscribe message for event registration issued from the client apparatus 100. Furthermore, the WSE module 15 carries out response processing in response to an unsubscribe message for erasing a registered event, notifies a notification message at event transmission, or the like.

A user authentication/authority confirmation module 20 performs user authentication based on a user certificate attached to a subscribe message transmitted from the client apparatus 100. Further, the user authentication/authority confirmation module 20 determines whether or not an authenticated user has authority of event registration at subscribe time and whether or not the protocol for event notification at notify time is an accepted protocol.

To perform the user authentication, the user authentication/authority confirmation module 20 uses a certificate held in the network-compatible apparatus 200 or available from a route certification organization via a network. Further, the user authentication/authority confirmation module 20 makes a query to a user management server that manages user authority information to thereby perform the authority confirmation.

A protocol decision module 21 determines whether or not a protocol for use in event transmission to the client apparatus 100 cannot be registered or must be restricted in use due to increase in communication load on the network-compatible apparatus 200 or lack of network resource.

In FIG. 1, reference numeral 14 denotes an event control module, 17 denotes a memory controller, and 18 denotes a storage device.

Next, with reference to the flowchart shown in FIGS. 2A and 2B, an event registration process according to the first embodiment will be explained. It should be noted that a subscribe message in this embodiment is written in an XML-SOAP format shown in FIG. 3.

Figure 2A:
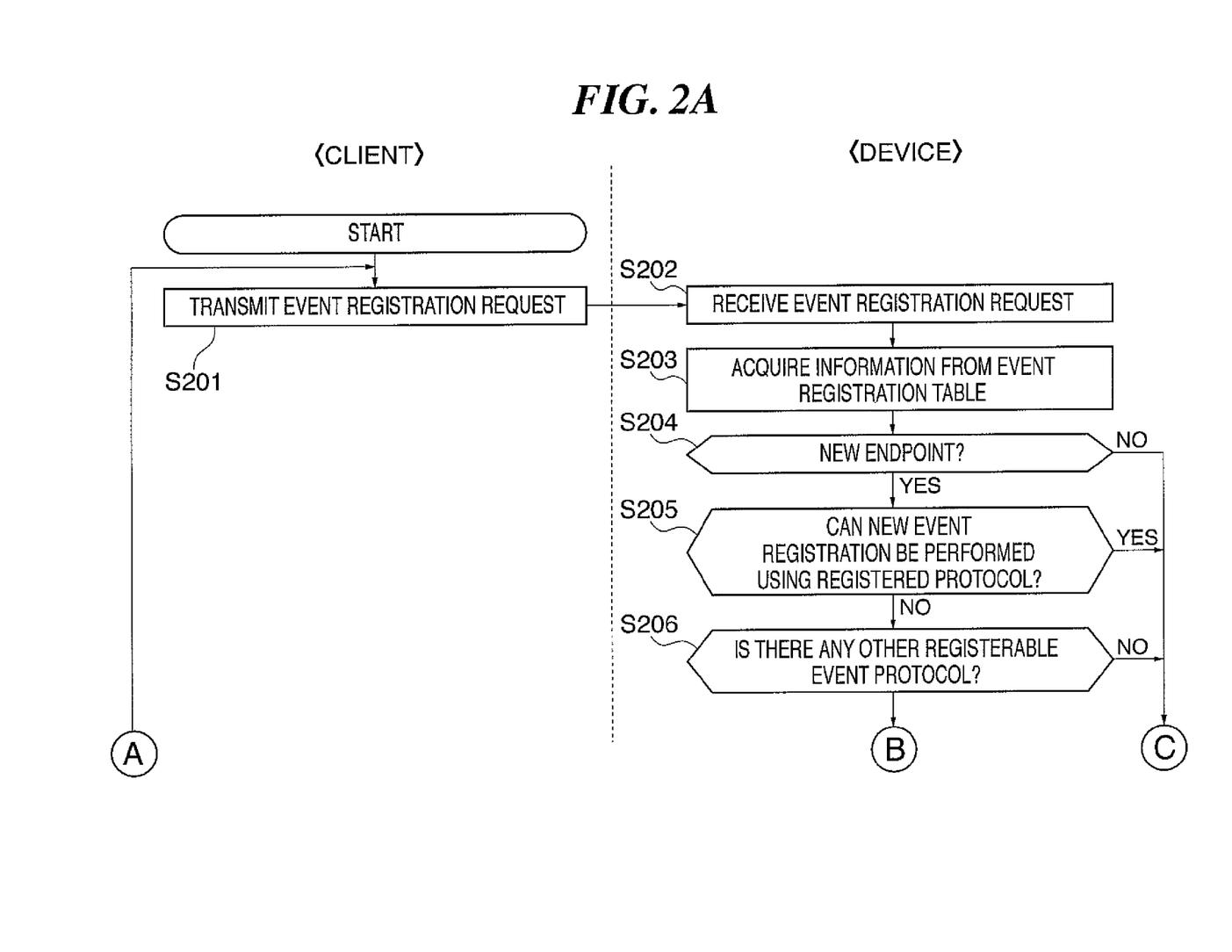
FIG. 2A is a part of a flowchart showing an event registration process in the first embodiment.
Figure 2B:
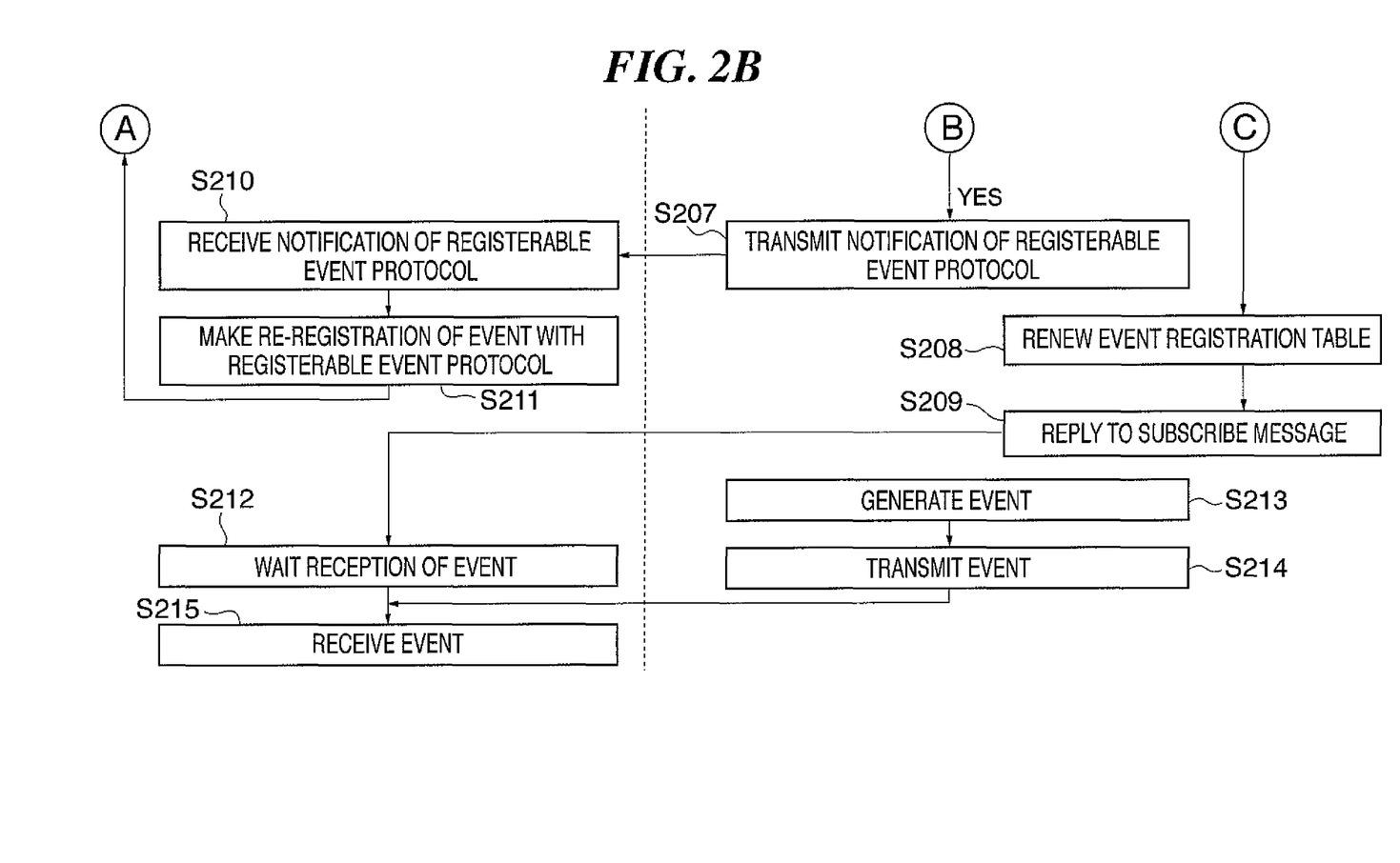
FIG. 2B is the remaining part of the flowchart of the event registration process.
Figure 3:
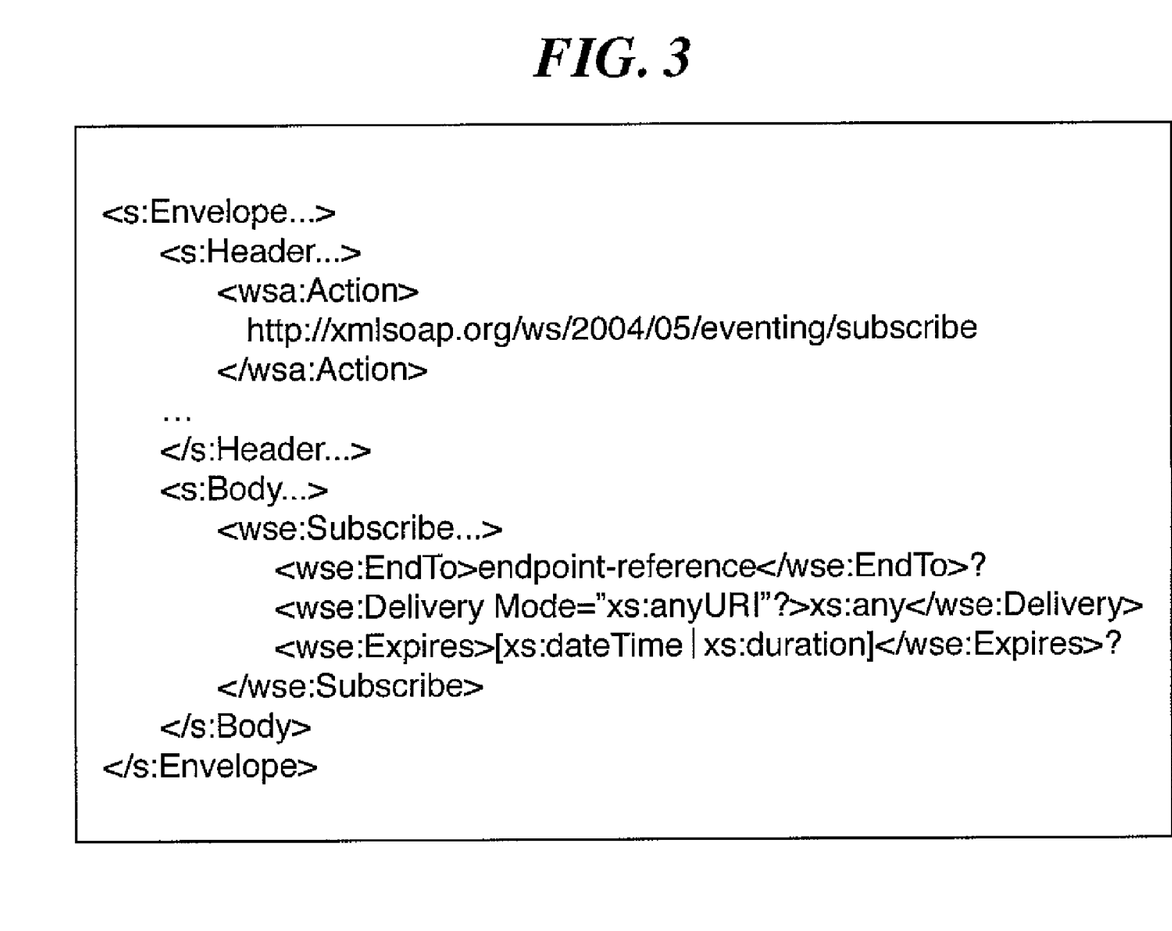
FIG. 3 is a view showing an example of a subscribe message.

Referring to FIGS. 2A and 2B, the client apparatus 100 transmits, as a SOAP message, a subscribe message associated with an event registration request to the network-compatible apparatus 200 (step S201). This transmission processing in the client apparatus is performed by the WSE module 5 under the control of the event control module 4, and the SOAP message is transmitted via the SOAP processor 3 and the TCP/UDP/IP protocol stack 1.

The network-compatible apparatus 200 receives via the network the subscribe message associated with the event registration request (step S202). The received subscribe message is notified via the TCP/UDP/IP protocol stack 11 to the SOAP processor 13 in which the received message is analyzed. Then the SOAP processor 13 notifies results of the analysis to the WSE module 15. The WSE module 15 analyzes the subscribe message notified from the SOAP processor 13 and notifies results of the analysis to the event control module 14.

The event control module 14 acquires information on registered addresses from an event registration table (step S203). This table information acquiring processing is performed to compare an address (event registration address) of the client apparatus 100 from which the subscribe message associated with the event registration request has been transmitted and an event notified party address (endpoint) for the event already registered in the network-compatible apparatus 200. The event registration table is constructed in the storage device 18.

The event control module 14 determines whether or not the address (event notified party address) in the subscribe message associated with the event registration request is a new endpoint (step S204). If the answer to the step S204 indicates that the event notified party address has already been registered in the event registration table, the event control module 14 renews the event associated with the event notified party address on the event registration table (step S208). Specifically, if the address in the subscribe message is not a new endpoint, the event control module 14 renews the event associated with the event notified party address on the event registration table. In this renewing processing, the event that is described in the subscribe message associated with the received event registration request is newly registered so as to correspond to the existed event notified party address on the event registration table.

Next, the event control module 14 transmits back to the client apparatus 100 a message indicative of results of the subscribe processing performed by the network-compatible apparatus 200, i.e., a message indicating that the event associated with the event registration request from the client apparatus 100 has been registered (step S209).

On the other hand, if it is determined at the step S204 that the event notified party address associated with the registration request is a new endpoint, the process proceeds to a step S205 in which the event control module 14 causes the protocol decision module 21 to determine whether or not new event registration can be performed using a requested protocol. Here, the requested protocol is a protocol described in subscribe message associated with the event registration request as one that is to be used at event reply (notification) time.

If it is determined that the new event registration can be carried out using the requested protocol, the event control module 14 renews the event associated with the event notified party address on the event registration table (step S208). In this renewal processing, the event associated with the subscribe message in the received event registration request and the protocol requested in that message are stored in the event registration table so as to correspond to the event notified party address in the subscribe message. The renewed registration information, as indicating results of the subscribe processing by the network-compatible apparatus 200, is transmitted back to the client apparatus 100 (step S209).

On the other hand, if the event registration cannot be carried out using the protocol requested by the client apparatus 100, the event control module 14 causes the protocol decision module 21 to determine whether or not there is other event protocol that can be registered (step S206).

The following is an explanation on determination processing carried out in the step S206. In consideration of communication load, it is assumed for example that the network-compatible apparatus 200 can register (reply to) five endpoints that use the TCP protocol requiring a relatively large communication load and ten endpoints that use the UDP protocol requiring a relatively small communication load. It is further assumed that all the five endpoints using the TCP protocol have already been registered in the network-compatible apparatus 200 but one or more endpoints that will use the UDP can further be registered. Under such an event protocol registration state, it is assumed here that the client apparatus 100 makes an event registration (subscribe) in which use of the TCP protocol is requested.

In this case, the protocol decision module 21 determines that the event registration of the subscribe notification with the requested protocol (TCP protocol) cannot be made, but the event registration thereof with the UDP protocol can be carried out.

It should be noted that in a case where the client apparatus 100 cannot perform event notification using a protocol requested in an event registration request, it may be possible to select one protocol therefor from predetermined priority protocols. The determination processing in the step S205 is performed based on the number of endpoints that is set beforehand on a protocol-by-protocol basis in consideration of communication load on the network-compatible apparatus 200.

In a case where it is determined by the protocol decision module 21 that there is no event protocol that can be registered, the event control module 14 renews the event associated with the event notified party address on the event registration table (step S208) In this renewing processing, the event notified party address relating to the request is registered as a new endpoint, but the protocol relating to the request is not registered. This renewed registration information as indicating results of the subscribe processing performed by the network-compatible apparatus 200 is transmitted back to the client apparatus 100 (step S209).

On the other hand, in a case that it is determined by the protocol decision module 21 that there is an event protocol that can be registered, the event control module 14 transmits back to the client apparatus 100 a message notifying of the client apparatus 100 the registerable event protocol (step S207).

The client apparatus 100 receives the message that notifies the registerable event protocol (step S210). In this case, in order to designate the registerable protocol as a protocol for event reply and perform re-registration of event, the client apparatus 100 again prepares a subscribe message for event registration request (step S211). After returning to the step S201, the client apparatus 100 retransmits the prepared subscribe message for event registration request to the network-compatible apparatus 200 using the registerable protocol notified in the step S207 from the network-compatible apparatus 200.

In this case, the result of the determination in the step S204 becomes No, and hence the flow proceeds to the step S208 in which, based on the retransmitted subscribe message for event registration request, the network-compatible apparatus 200 registers the registerable protocol relating to the aforesaid notification so as to correspond to the corresponding event notified party address on the event registration table.

Then, in step S209, the client apparatus 100 receives a message relating to the subscribe processing result sent back from the network-compatible apparatus 200, whereupon the client apparatus 100 is transited to an event awaiting state (step S212).

On the other hand, when an event is generated (step S213), the network-compatible apparatus 200 transmits event information associated therewith to a corresponding client apparatus 100 (step S214).

In this case, the client apparatus 100 having been transited to the event awaiting state receives event information sent to the client apparatus (step S215).

It should be noted that the flow from event generation to event reception in the steps S213 to S215 is made effective during a time period from subscribe time to unsubscribe time as in an ordinary event registration protocol, and the flow is repeatedly carried out during the effective time period.

As described above, in the first embodiment, the network-compatible apparatus 200 as the event providing apparatus sets the number of users (client apparatuses) or the number of endpoints up to which event registration can be made on a protocol-by-protocol basis in consideration of communication load at event reply time. Subsequently, when an event registration request is issued from a client apparatus 100, the network-compatible apparatus 200 carries out the event registration process such that such endpoint number is not exceeded. In this process, in a case where the protocol indicated in the registration request cannot be registered as a protocol for event reply but other protocol requiring a smaller communication load can be registered as the event reply protocol, the network-compatible apparatus 200 notifies the client apparatus 100 of such protocol. When an event registration request is made in which the protocol notified by the notification is indicated as the event reply protocol, the network-compatible apparatus 200 formally performs the event registration process.

As a result, it is possible to flexibly change the protocol for use for event-related communication in consideration of communication load applied to the event providing apparatus. Furthermore, it is possible to avoid a situation from occurring in which use of a network equipment management application by a manager is hindered.

Second Embodiment

Figure 4A:
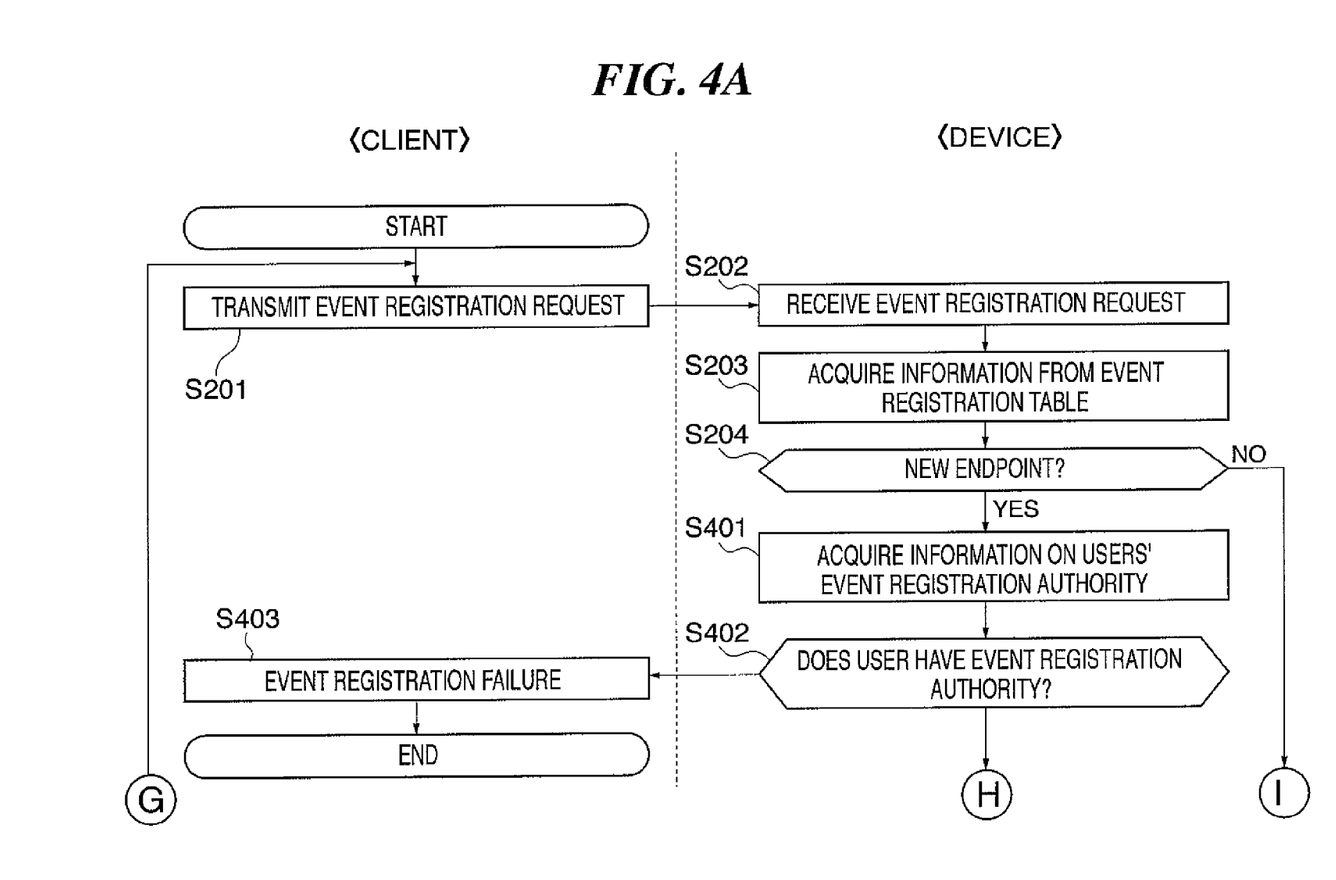
FIG. 4A is a part of a flowchart showing an event registration process in a device according to the second embodiment.
Figure 4B:
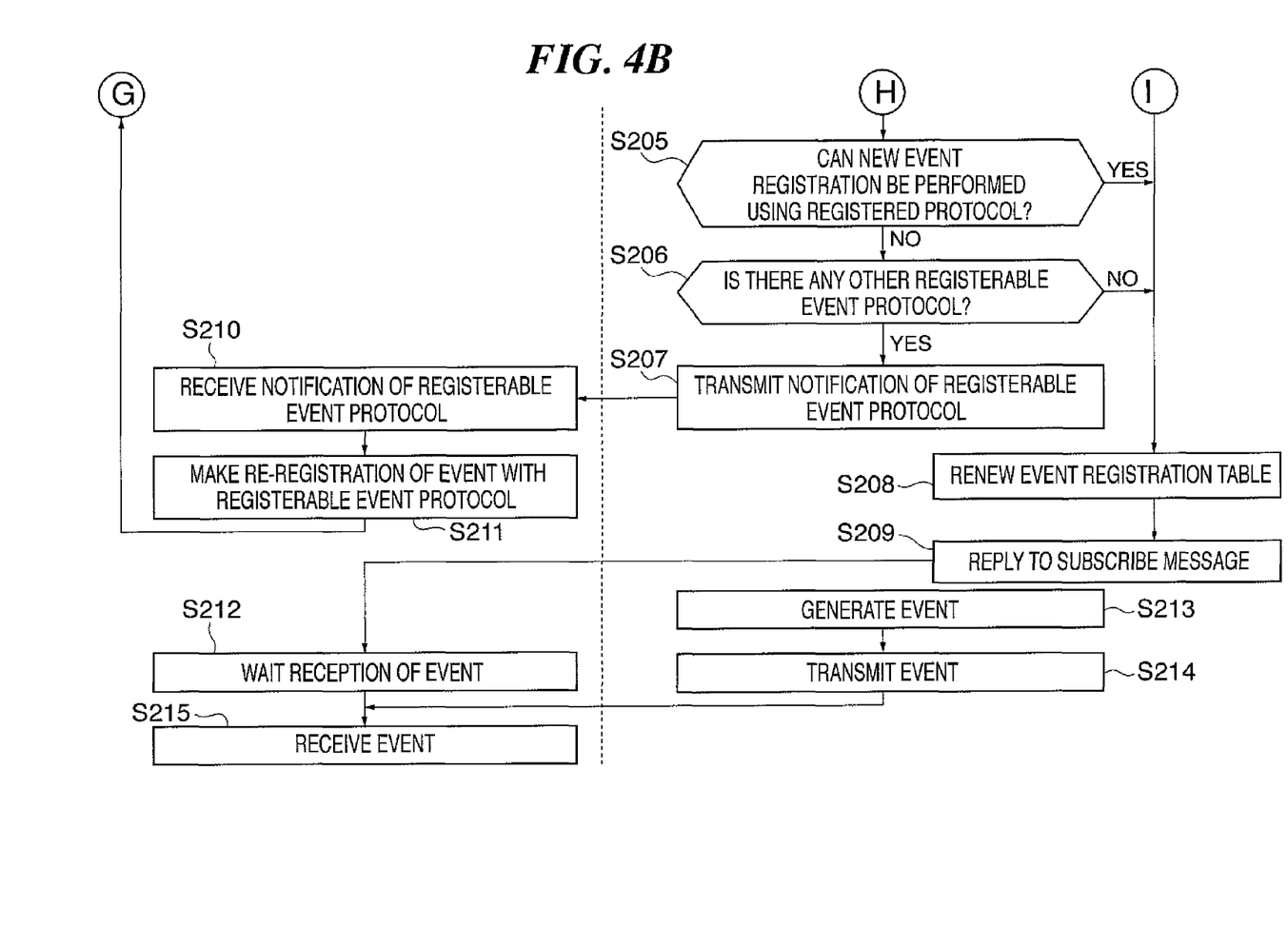
FIG. 4B is the remaining part of the flowchart of the event registration process.

According to a second embodiment, the network-compatible apparatus 200 identifies a user who has requested event registration, and restricts use of event reply protocol where required. It should be noted that the system construction of the second embodiment is entirely the same as that of the first embodiment shown in FIG. 1. Furthermore, most parts of an event registration process shown in FIGS. 4A and 4B are common to corresponding parts of the event registration process in the first embodiment shown in FIGS. 2A and 2B. Thus, different parts thereof will mainly be described below, and like steps similar in processing content to those shown in FIGS. 2A and 2B are denoted by like step numbers in FIGS. 4A and 4B.

Referring to FIGS. 4A and 4B, the network-compatible apparatus 200 receives a subscribe message for event registration request transmitted from a client apparatus 100 (step S202). This received massage is notified from the WSE module 15 to the user authentication/authority confirmation module 20. It is assumed here that the client apparatus 100 that has requested event registration is a new endpoint (step S204). In this case, the user authentication/authority confirmation module 20 acquires a list of event registration authority information on individual users stored in the storage device 18 (step S401).

Then, based on the list of event registration authority information, the user authentication/authority confirmation module 20 performs user authentication in respect of the user who has transmitted the subscribe message for event registration request, and determines whether or not the user has event registration authority (step S402). In this case, the user authentication/authority confirmation module 20 carries out user authentication processing in accordance with a challenge-response method using a user certificate attached to the subscribe message for the event registration request, and determines the presence/absence of event registration authority.

It should be noted that the processing for determining the presence/absence of event registration authority is carried out only after the user has been authenticated. The user authentication/authority confirmation processing is carried out by making a query to a user authority management server or the like in which user authority information is managed, or using a certificate issued from a route certification organization which is available via a network.

Not only the presence/absence of event registration authority can be determined, but also confirmation processing to determine whether or not the protocol for use for event reply (notification) to provide the client apparatus 100 with notification is an accepted protocol.

In a case where the user cannot be authenticated or the user has no event registration authority or the protocol for use for event reply to make notification is not an accepted protocol, the event control module 14 notifies the client apparatus 100 having made the event registration request that the event registration is failed (step S403). When receiving this notification, the client apparatus 100 finishes the event registration process.

Figure 5:
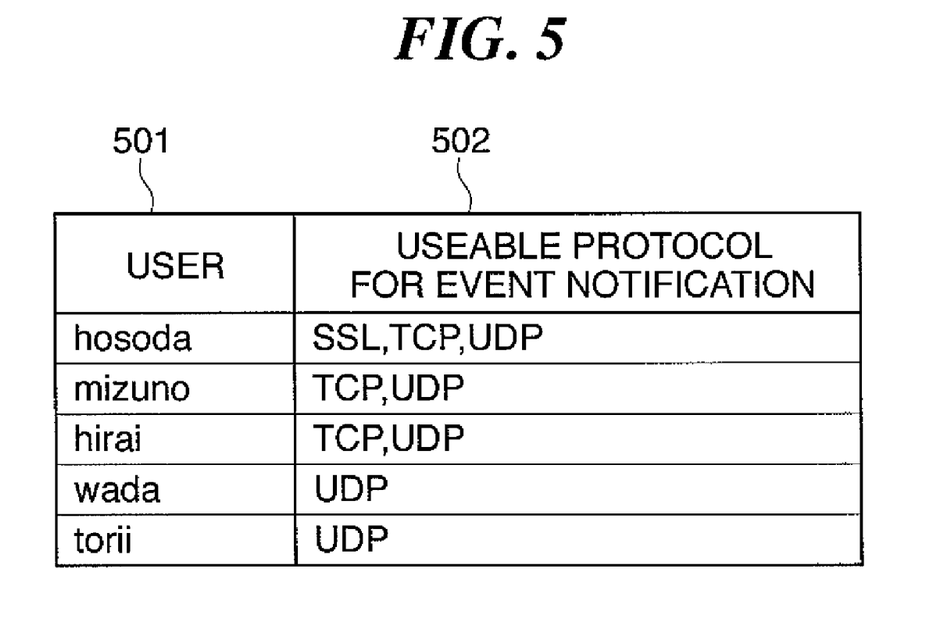
FIG. 5 is a view showing, on a user-by-user basis, an example of a protocol usable for event notification.

FIG. 5 is a view showing a user-by-user basis an example of a protocol that is usable for event notification. As shown in FIG. 5, names of protocols that are usable by respective users at event reply time are registered so as to correspond to user names 501. These pieces of protocol information are stored in advance in the storage device 18.

In a case where it is determined at the step S402 that the user has event registration authority, a determination is made as to whether new event registration using a requested protocol can be carried out (step S205). Processing in the step S205 and subsequent steps has already been descried in the first embodiment, and therefore explanation thereof will be omitted.

With the above described processing, a protocol useable for event reply can be restricted on a user-by-user basis.

Third Embodiment

A third embodiment is configured to carry out event registration processing such that an event protocol for use by a general user is changed in a case where there may increase in communication load on the network-compatible apparatus 200 at event reply time.

Figure 6A:
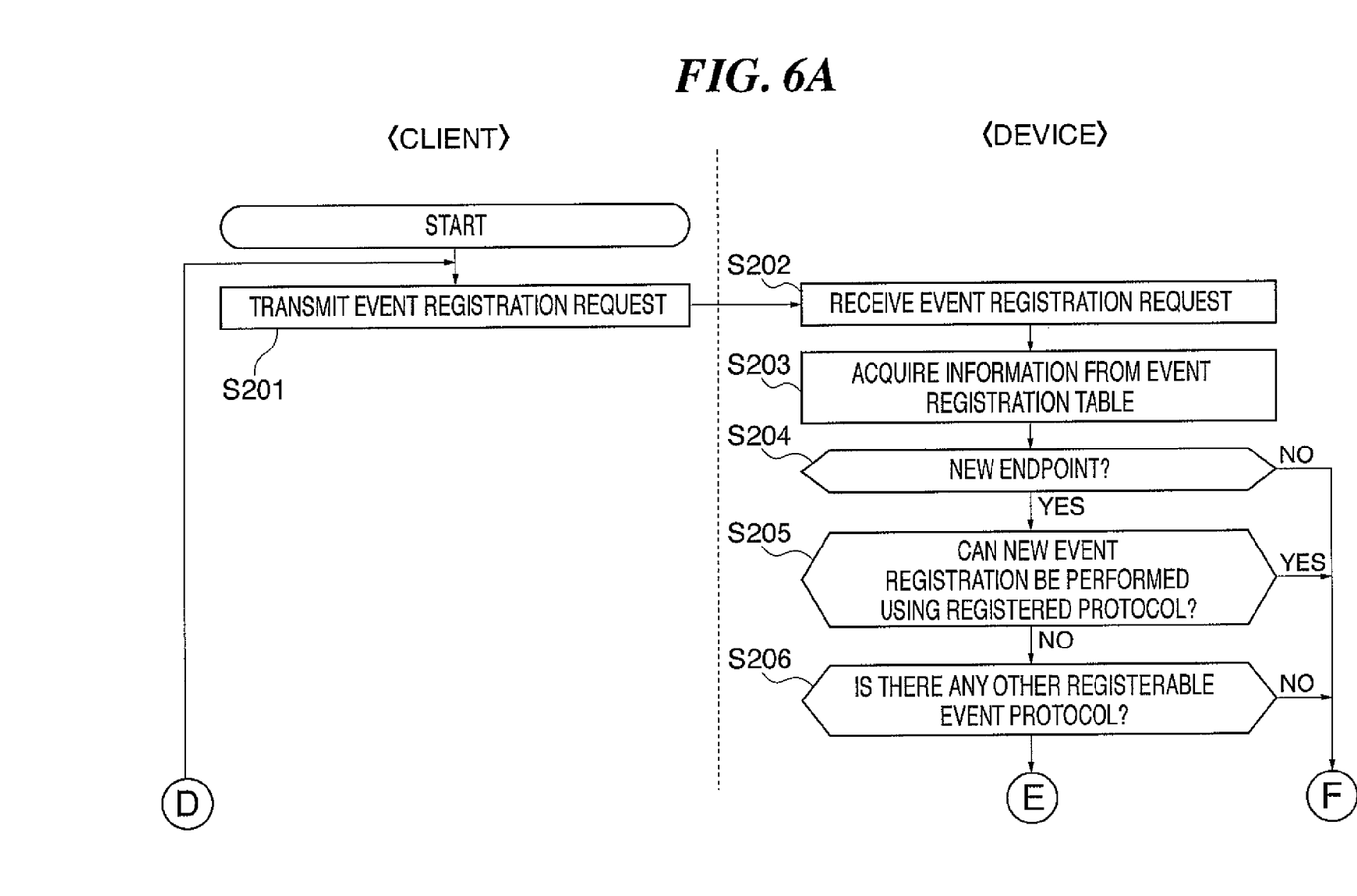
FIG. 6A is a part of a flowchart showing an event registration process in a device according to the third embodiment.
Figure 6B:
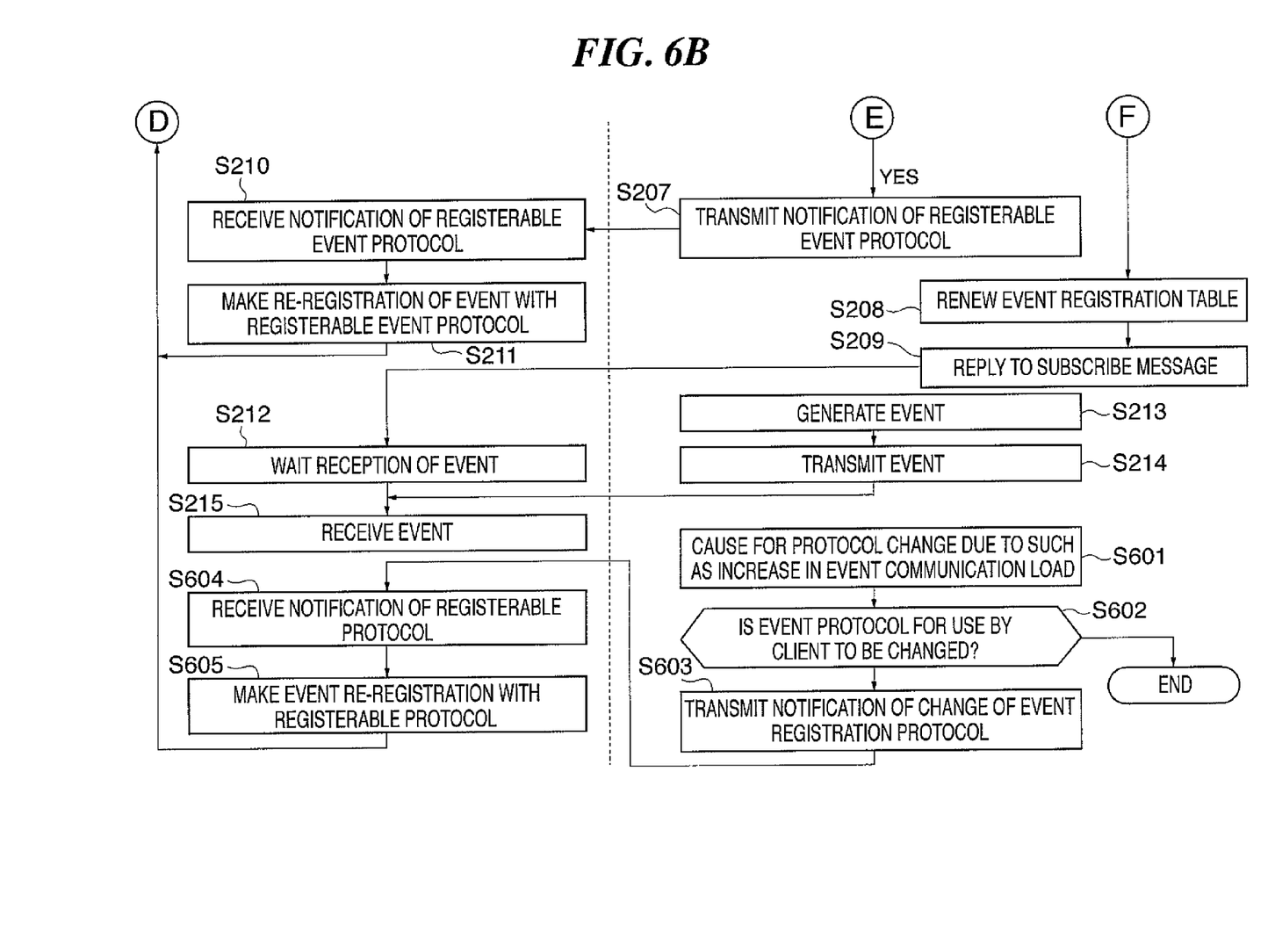
FIG. 6B is the remaining part of the flowchart of the event registration process.

It should be noted that the system configuration in the third embodiment is entirely the same as that of the first embodiment shown in FIG. 1. Furthermore, most parts of an event registration process relating to the third embodiment shown in FIGS. 6A and 6B are similar to those of the first and second embodiments shown in FIGS. 2A, 2B, 4A and 4B, and different parts will mainly be described hereinbelow. In FIGS. 6A and 6B, like steps similar in processing content to those shown in FIGS. 2A, 2B, 4A and 4B are denoted by like step numbers.

Processing in steps S201 to S215 in FIGS. 6A and 6B in the event registration process is the same as that in the first embodiment, and therefore, an explanation thereof will be omitted.

It is assumed here that there occurs a cause for protocol change such as, for example, the possibility of rapidly increased communication load at event reply time due to event registration requests from a large number of client apparatuses 100 being concentrated in the same time zone (step S601). When such a cause of protocol change is generated, the event control module 14 determines whether or not the event protocol for use by any of the client apparatuses 100 must be changed (step S602).

A determination criterion can be determined as follows: In the network-compatible apparatus 200, one or more threshold values of communication processing load at event transmission time such as a ratio of communication load at event transmission time to the entire CPU load, a maximum allowable number of registration of endpoints that will use the TCP protocol, and so forth are determined in advance. When any one or more of the threshold values are exceeded, it is possible to adopt a method such as changing from the TCP protocol requiring a relatively large load to the UDP protocol requiring a relatively small load.

When it is unnecessary to change the event protocol, the event control module 14 terminates the present process. On the other hand, when the event protocol must be changed, the event control module 14 notifies concerned one or more client apparatuses 100 of an after-change protocol that can be registered (step S603). To this end, for example, the priority is prescribed on a user-by-user basis in the table shown in FIG. 5. The client apparatus for a user having a lower priority is selected as the concerned client apparatus 100, and an event protocol change request is notified to only concerned one or more of the client apparatuses 100.

The client apparatus 100 receives a notification indicating the registerable protocol (step S604), and makes an event registration request again using a subscribe message in which the registerable protocol is specified as event protocol (steps S605 and S201).

It should be noted that the present invention is not limited to the first to third embodiments. For example, in the first to third embodiments, it is assumed that the protocol for event transmission is changed from the TCP protocol to the UDP protocol when there may increase in communication load. However, the above is not limitative. For example, in a case where all the allowable number of endpoints using the TCP protocol have already been registered and thereafter an event registration request specifying the TCP protocol is made by a user having a manager authority, the event transmission protocol for general users may be changed from the TCP protocol to the UDP protocol.

In the above-described embodiments, the communication load applied to the network-compatible apparatus 200 at event notification time is determined based on the criterion, i.e., the number of client apparatuses for which event registration has been made. However, the criterion for determining the communication load is not limited thereto, but rather the communication load applied to the network-compatible apparatus 200 at event notification may be determined using a different method.

Although the protocol defined by WS-Eventing is adopted for making an event registration request by the client apparatus 100 and an event notification (reply) by the network-compatible apparatus 200, another protocol may be used therefor.

A communication medium such as a local I/O, a network, or the like other than Ethernet® compatible medium used in the first to third embodiments may be used. A network-compatible apparatus such as a scanner, a storage apparatus, or the like other than a printer may be used as an event providing apparatus.

In the aforementioned embodiments, the arrangement has been described where the network-compatible apparatus 200 accesses data stored in a memory for use for confirmation of user's authority. However, the present invention is applicable to not only the accessing to the data for confirmation of user's authority but also the accessing to a database set in advance or data held by application or utility software. Furthermore, this invention is applicable to a case where such data is held by the network-compatible apparatus 200 or by a third server.

Unless otherwise specified, the scope of this invention is not restricted by the protocols, versions, addresses, numeric values, and the like described in the embodiments.

It is to be understood that the present invention may be accomplished by supplying a system or an apparatus with a storage medium stored with a program code of software, which realizes the functions of any of the above described embodiments. The present invention may also be accomplished by causing a computer (or CPU, MPU or the like) of the system or the apparatus to read out and execute the program code stored in the storage medium.

In this case, the program code itself read from the storage medium realizes the functions of any of the above described embodiments, and therefore the program code and the storage medium in which the program code is stored constitute the present invention.

Examples of the storage medium for supplying the program code include a Floppy® disk, a hard disk, a magnetic-optical disk, an optical disk such as a CD-ROM, a CD-R, a CD-RW, a DVD-ROM, a DVD-RAM, a DVD-RW, or a DVD+RW, a magnetic tape, a nonvolatile memory card, and a ROM. Alternatively, the program may be downloaded via a network.

Further, it is to be understood that the functions of any of the above described embodiments may be accomplished by causing an OS (operating system) or the like which operates on the computer to perform a part or all of the actual operations based on instructions of the program code.

Further, it is to be understood that the functions of any of the above described embodiments may be accomplished by writing a program code read out from the storage medium into a memory provided on an expansion board inserted into a computer or a memory provided in an expansion unit connected to the computer and then causing a CPU or the like provided in the expansion board or the expansion unit to perform a part or all of the actual operations based on instructions of the program code.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-119257, filed Apr. 24, 2006, which is hereby incorporated by reference herein in its entirety.

What is claimed is:

1. A device comprising:
   a receiver device adapted to receive an event registration request transmitted from each of at least one information processing apparatus on a network;
   a notification device adapted to notify a generated event to a corresponding one of the at least one information processing apparatus based on the event registration request received by said receiver device;
   a storage device adapted to store at least one threshold value relating to communication load caused by event notification;
   a determination device adapted to determine whether or not the communication load caused by event notification exceeds the threshold value in a case where said receiver device receives the event registration request; and a decision device adapted to decide, based on a result of determination by said determination device, a protocol for use for the event notification to the event registration request, wherein said event registration request includes information for identifying the protocol for use for the event notification to the event registration request, and said decision device is adapted to change the protocol requested in the event registration request based on the result of determination by said determination device.

2. The device according to claim 1, wherein said decision device is adapted to make a protocol change from the protocol requested in the event registration request received by said receiver device when it is determined by said determination device that the communication load caused by the event notification exceeds the threshold value.

3. The device according to claim 1, wherein said decision device is adapted to notify an after-change protocol to the information processing apparatus that has transmitted the event registration request prior to making a protocol change from the protocol requested in the event registration request received by said receiver device, and is adapted to make the protocol change in a case where an event registration request in which the after-change protocol is identified is retransmitted.

4. The device according to claim 1, wherein in a case where a protocol change is made due to an event registration request being transmitted from a user or one of the at least one information processing apparatus having a manager authority, said decision device is adapted to change a protocol for use by at least one user or at least one of the at least one information processing apparatus not having the manager authority.

5. The device according to claim 1, including:
a second determination device adapted to determine whether or not a user or one of the at least one information processing apparatus from which the event registration request has been transmitted has an authority for causing the device to perform event registration.

6. The device according to claim 1, wherein in a case where a protocol change is made, said decision device is adapted to make a protocol change to a protocol requiring small communication load.

7. The device according to claim 1, wherein said determination device is adapted to determine whether or not number of at least one of the at least one information processing apparatus that is notified of event notification from said notification device exceeds the threshold value.

8. A control method of a device comprising:
a receiver step of receiving an event registration request transmitted from each of at least one information processing apparatus on a network;
a notification step of notifying a generated event to a corresponding one of the at least one information processing apparatus based on the event registration request received in said receive step;
a storage step of storing at least one threshold value relating to communication load caused by event notification;
a determination step of determining whether or not the communication load caused by event notification exceeds the threshold value in a case where said receiver step receives the event registration request; and
a decision step of deciding, based on a result of determination by said determination step, a protocol for use for the event notification to the event registration request,
wherein said event registration request includes information for identifying the protocol for use for the event notification to the event registration request, and said decision step includes changing the protocol requested in the event registration request based on the result of determination by said determination step.

9. A non-transitory computer-readable storage medium storing a program, that when executed by a computer, causes the computer to execute a control method of a device, the method comprising:
a receiver step of receiving an event registration request transmitted from each of at least one information processing apparatus on a network;
a notification step of notifying a generated event to a corresponding one of the at least one information processing apparatus based on the event registration request received in said receive step;
a storage step of storing at least one threshold value relating to communication load caused by event notification;
a determination step of determining whether or not the communication load caused by event notification exceeds the threshold value in a case where said receiver step receives the event registration request; and
a decision step of deciding, based on a result of determination by said determination step, a protocol for use for the event notification to the event registration request,
wherein said event registration request includes information for identifying the protocol for use for the event notification to the event registration request, and said decision step includes changing the protocol requested in the event registration request based on the result of determination by said determination step.

* * * * *